Oct. 13, 1936.  P. ROBINSON  2,057,315
ELECTROLYTIC DEVICE
Filed Aug. 25, 1934  2 Sheets-Sheet 2
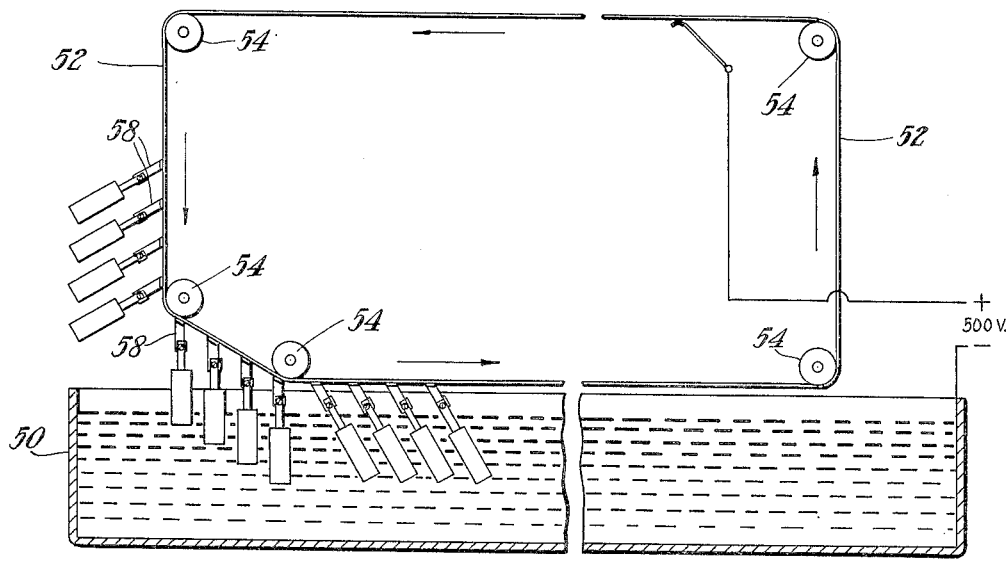
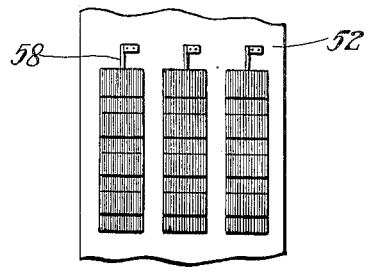
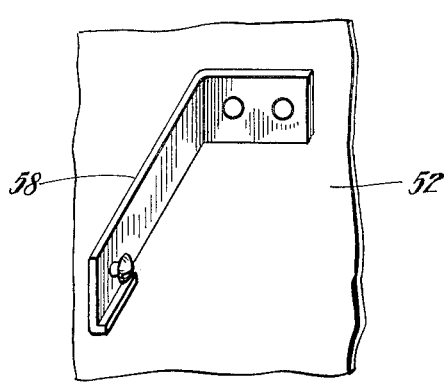
INVENTOR.
PRESTON ROBINSON
BY Dorsey & Cole
ATTORNEYS Patented Oct. 13, 1936

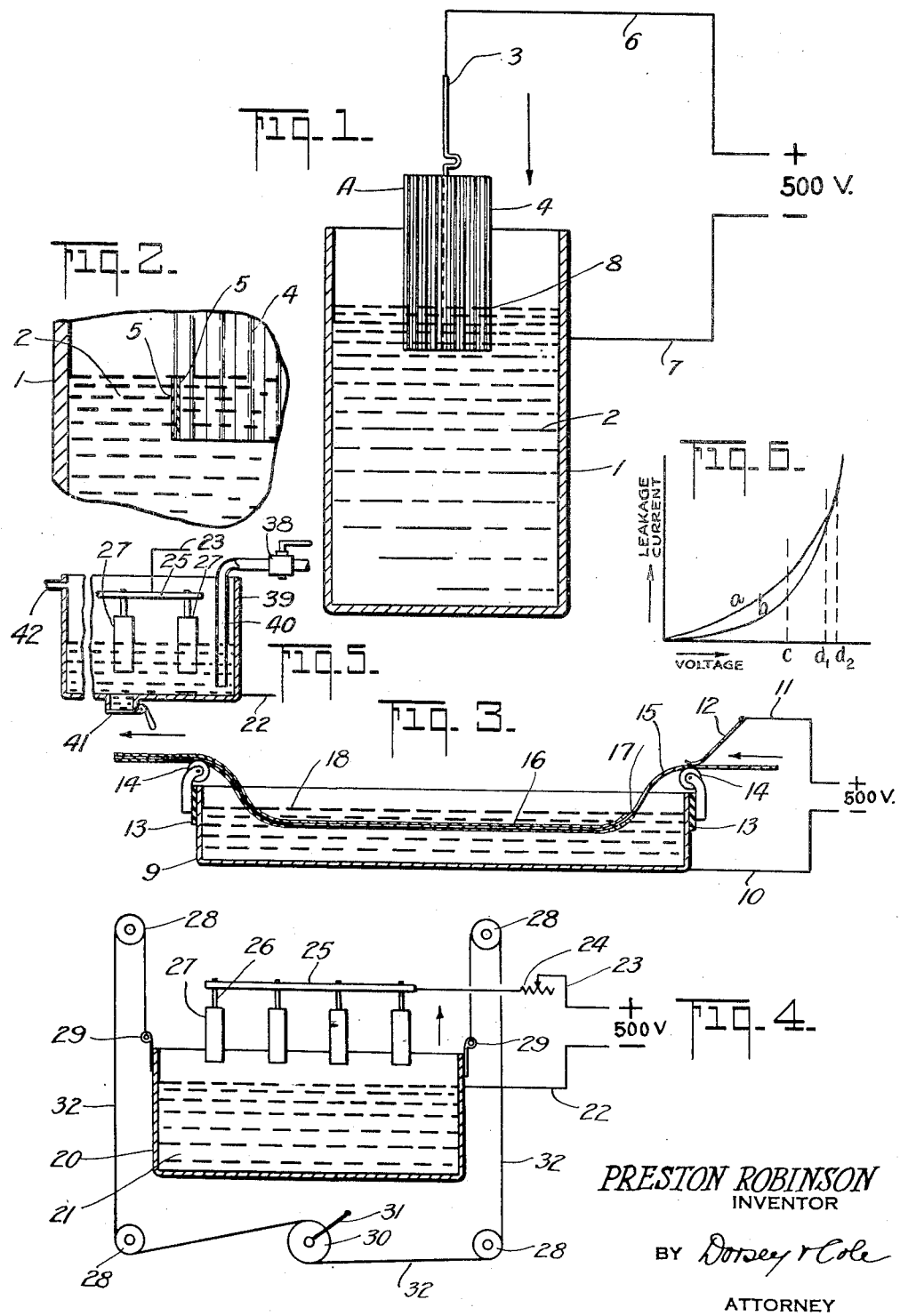

2,057,315

UNITED STATES PATENT OFFICE 2,057,315

ELECTROLYTIC DEVICE

Preston Robinson, Williamstown, Mass., assignor to Sprague Specialties Company, North Adams, Mass., a corporation of Massachusetts Application August 25, 1934, Serial No. 741,493

13 Claims. (Cl. 175—315)

The present invention relates to electrolytic condensers and more particularly to the process of formation of the filmed electrodes of such condensers, and to the film obtained by such process, this application forming a continuation in part of my copending application Serial No. 548,270, filed July 1, 1931.

The general principle on which is based the condenser action of the electrolytic cells having so-called filmed electrodes, is well understood and no detailed description thereof is deemed necessary.

There are several requirements which electrolytic condensers have to meet to be of commercial usefulness. Among the most important of these requirements may be mentioned that the condenser has to stand a certain breakdown-voltage; should have a small leakage current and low power factor; that for a given breakdown voltage and for a given electrode area it should have a certain capacity, and that it maintain its desired characteristics for several years, whether it be in operation or be idle. Thus in general the quality of the condenser depends either primarily, or at least to a considerable extent, on the quality of the film.

The initial qualities of the film, and to a great extent also its later behavior, depends in its turn on three main factors: These factors are first, the material of the filming electrode, secondly, the electrolyte used in formation, and thirdly, the character and rate of the electrical energy supplied for film formation and of its transformation into film-forming chemical reaction.

My present invention is primarily concerned with this third factor.

Various filming metals form suitable materials for the filming electrodes of such condensers, such metals being, for instance, aluminum, tantalum, zirconium, etc. Aluminum, because of its good filming properties, easy workability and low price, is the most widely employed, and I shall describe my invention with reference to aluminum electrodes, although it should be well understood that it equally applies to electrodes made of other filming metals.

As electrolytes for the formation of the films, as a rule aqueous solutions of suitable ionogens are used, although in some instances alcoholic solutions or solutions having a plurality of ionizing solvents may be employed.

As ionogens of the electrolyte, usually weak acids and/or salts of weak acids are used, although occasionally other ionogens may be used. The most commonly used ionogens are weak acids, as boric acid, phosphoric acid, citric acid, etc., and/or salts of weak acids, usually alkaline metal or ammonium salts; whereby the acid of the salt does not need to be the same as the weak acid used.

In condensers used for filter circuits and in other applications, where in the circuit a D. C. component prevails, as a rule, only one electrode of the condenser, namely, the anode, is filmed, whereas in alternating current circuits, as a rule condensers having two filmed electrodes are used.

The formation of the electrode (or electrodes) usually takes place before the assembly of the condenser, and the final electrolyte used in the condenser usually differs from the forming electrolyte to a greater or lesser extent. The final electrolyte may be a liquid electrolyte in which case the condensers are so-called "wet" electrolytic condensers, or it may be a more or less viscous electrolyte—usually carried by a spacer— in which case the condensers are so-called "dry" electrolytic condensers.

Occasionally in wet, as well as in dry electrolytic condensers, the electrode, instead of being formed in a separate forming electrolyte before the assembly of the condenser, is formed in the final electrolyte after the condenser has been assembled, or electrodes formed in a separate forming electrolyte are subjected to a second formation in the final electrolyte, after the condenser has been assembled.

In describing my invention, I shall assume that the electrodes are formed in a separate forming electrolyte, although my invention equally applies to other forming processes.

In the usual method of producing films, either by direct or by alternating current, it has been the general practice to gradually raise the voltage, as a rule in distinct steps, until the maximum value of the forming voltage was reached. The maximum forming voltage is usually, but not necessarily, determined by the operating voltage of the condensers, the selected maximum forming voltage being as a rule somewhat higher than is the maximum voltage which the condenser has to stand in operation.

The formation of electrodes by such known methods required as a rule, several hours, frequently as much as ten to fifteen hours. This was due to the following reasons: As the initial low voltage is applied to the filming electrode immersed in the forming electrolyte, the film is gradually built up on same, and the initial leakage current is large, but as the formation at a given voltage continues, the leakage current gradually drops to a desired low value. When the voltage is then raised from this initial low value to the next higher value, the same procedure takes place, i. e., the initial leakage current is large and then gradually decreases, until it falls to the desired low value. The current density used has been small and the formation at each voltage step has to take place for a sufficiently extended time period to permit the leakage current to fall to the desired value; and as the number of voltage steps was large, the formation process has been necessarily quite slow.

Such slow formation has not only the drawback of being time-consuming, but involves a considerable waste of electrical energy. Various attempts have been made in the past to reduce the formation time by reducing the number of forming steps, but the results were generally unsatisfactory and resulted in a poorer quality film. It has been therefore assumed that good results can be only arrived at with a reasonably slow and gradual film formation.

I have found that the above drawbacks of step-by-step formation can be altogether avoided and that the formation time can be reduced to an entirely unexpected extent, which not only results in a great saving in forming time and energy, but results in films which, instead of being inferior to those obtained in slow formation, exhibit superior qualities to those obtained by said known methods.

The essential differences between my process and that of the prior art are the following: Instead of gradually increasing the forming voltage, I immediately apply the full forming voltage; instead of forming the electrode at a limited and small current density, I form with an extremely high and practically unlimited current density; and instead of forming the entire surface of the electrode at once, I form successive portions thereof, whereby the unfilmed portions immersed at any moment in the electrolyte are almost infinitesimally small.

In accordance with my invention the electrodes to be formed are gradually immersed in the electrolyte and a high voltage, as a rule the full (maximum) forming voltage, is directly applied to the immersing unformed electrode portions. As an unfilmed portion of the electrode immerges into the electrolyte, it offers practically no resistance to the passage of current, and by keeping the series resistance in the forming circuit quite low I pass a very large current through the unfilmed electrode portion.

At any given instant only a very small unfilmed electrode surface being exposed to the electrolyte, an extremely high and almost infinite current density exists at this surface, and as an unfilmed electrode portion immerges in the electrolyte, due to the high forming voltage and the extremely high current density, an almost instantaneous formation of the film takes place thereon. After the film is formed on this portion, current flow through it is practically blocked, so that as the next unfilmed portion is immersed in the electrolyte it is similarly subjected to a formation at extremely high current densities.

In practice the current source is not of unlimited capacity and the formation of an unfilmed electrode portion instead of being instantaneous may take a certain short but finite time, (of the order of fractions of seconds or seconds), the forming time depending on the capacity of the current source; its voltage; the contour line of the immersed electrode; rate of advance of the electrode, etc.

The film formed on the electrode by my novel forming process, differs in several respects from the films obtained by prior art forming processes.

Two of the characteristics of this film are its very high density and its exceptionally good adherence to the underlying metal layer.

The above properties of the film are apparently due to the extremely high electrostatic pressure prevailing at the film, in the formation.

In formation, in accordance with the electrostatic theory, the ions of the electrolyte exert on the film a pressure, the equivalent value of which is approximately proportional to the square of the field strength at the film and to the square of the current density of the forming current, and inversely proportional to the dielectric constant.

Disregarding the influence of the dielectric constant—which does not greatly differ when using my novel forming process from that in the case of prior art forming processes—it will appear that because of the high applied voltage (high field strength) and the extremely high current densities used in my forming process, compared with the low initial voltages and the low current densities used in prior forming processes, the equivalent pressure exerted by the ions on the film during formation, is of a different order of magnitude in my process from that in the prior art forming processes.

Rough calculations show that in prior forming processes the equivalent ion pressure as a rule does not exceed about 500,000 pounds per square inch, whereas in my process, pressures of the order of 100,000,000 pounds, and even higher, occur.

A further important difference between the film obtained by my process and that obtained by prior art forming processes is, that while the films formed by the prior art processes consist partly of hydrated and partly of unhydrated oxide film, the film obtained with my process, consists entirely of unhydrated oxide film.

Such an unhydrated oxide film exhibits a greater stability than does a partly hydrated film, which results among other advantages, in a greater stability and better shelf life of the condensers using electrodes having such films.

The fact that the films obtained by my novel forming process are unhydrated, is due to the speed of the formation and the high ion pressure prevailing in formation, and this property of the films is closely connected with their high density.

The non-hydrated oxide film also differs from the partly hydrated film, by showing a different current-voltage relationship.

For condensers having electrodes the film of which is unhydrated, the current—within a voltage range up to about three-quarters of the forming voltage—is approximately proportional to the square of the voltage, following the equation $$i = kV^2 \qquad 1$$

where $i$ is the current, $V$ the voltage and $k$ a constant.

For an unhydrated aluminum oxide film, the mechanism of current conduction is that of cold electron emission, for that case, when the field strength required to pull out the electrons is also sufficient to prevent space charge. This in known manner, results in the current being proportional, as a first approximation, to the square of the voltage.

On the other hand, with electrodes having hydrated films, the D. C. leakage current varies for the same voltage range, approximately with the $$\frac{3}{2}$$

power of the voltage, following an equation:

$$i = k_1 V^{\frac{3}{2}} \quad \text{------} 2$$

This seems to be due to ionization of the hydrated film, possibly by electrons being captured by the water molecules in the film, and thereby setting up space charge, although I am not certain of the correctness of this explanation, except that the three-half power character of the current-voltage curve indicates the presence of space charge.

The film of the prior art being partly hydrated and partly unhydrated, the condensers using same have a current-voltage characteristic which is intermediate to that determined by Equations 1 and 2.

As stated, the density of the film formed with my novel process is considerably higher than that of the films formed by prior processes. This difference can be determined by comparative density measurements, by removing the aluminum from the film by means of an acid or alkali, and then measuring the density of the film.

In the drawings forming part of this specification:

Figure 1 is a schematic diagram, showing the formation of an electrode with my novel process, the electrode being gradually immersed in the forming electrolyte, while the full voltage is applied between the electrode and the electrolyte.

Fig. 2 is a fractional view of Figure 1 on an enlarged scale, illustrating the formation of the film at the point of immersion of the electrode.

Fig. 3 is a schematic view showing the formation of an endless electrode foil, in accordance with my invention.

Fig. 4 is a schematic view showing the formation of a plurality of electrodes by means of my novel process, in which the forming tank is moved towards fixedly mounted electrodes.

Fig. 5 is a schematic fractional view showing the formation of a group of electrodes which are placed within a tank, in which the electrolyte level is gradually raised by gradual admission of the electrolyte.

Fig. 6 is a diagram showing comparative current-voltage curves of condensers having electrodes formed according to the prior art and according to the invention respectively;

Fig. 7 is a schematic view showing the formation of individual electrodes by a continuous process using a belt conveyor;

Fig. 8 is a fractional front view of a portion of the belt of Fig. 7;

Fig. 9 is a perspective view showing an attachment bracket for the individual electrodes.

Referring to Figure 1, the forming tank 1 is preferably made of metal, for instance of copper, although it can be made of insulating material and provided with a metal lining, or a separate cathode can be provided in the electrolyte. The forming tank comprises a suitable film-forming electrolyte 2, consisting preferably of an aqueous solution having ionogens of the type above described. The composition of the electrolyte depends on several factors, connected with the desired properties of the condenser. In most cases I prefer to use an aqueous solution of boric acid or phosphoric acid to which I add a salt, for instance an alkaline or ammonium salt of a weak acid.

The aluminum electrode 4 is shown in the drawings as being formed as an accordion pleating from thin aluminum sheet, the pleating being secured to a supporting stem 3. Such a construction is described in application Ser. No. 606,943 of Sprague and McCann, now Patent No. 1,997,185. The stem 3 is connected by means of lead 6 to one side of the current source, the other side of which is connected through lead 7 to the tank 1. The current source is preferably a D. C. source, in which case the positive side of the source is connected to electrode 4. The current source should have a sufficiently large current capacity.

The forming voltage, as stated, preferably corresponds to the maximum forming voltage and in the examples illustrated is assumed to be 500 volts. This forming voltage, of course, may be higher or lower, but for the now commercially used so-called high-voltage electrolytic condensers, usually falls between 350 to 750 volts. For so-called low-voltage electrolytic condensers the forming voltage may be considerably lower.

As a rule I provide no resistance in the forming circuit, the comparatively small series resistance of the electrolyte generally sufficing to prevent damaging short-circuiting of the current source.

As has been explained before, the electrode 4 is gradually lowered into the forming electrolyte. As successive unformed electrode portions enter the electrolyte at 8 (see Figs. 1 and 2) a current of very high density passes through same. Because of the high current density and the high forming voltage the successive unfilmed electrode portions are almost instantaneously filmed upon their immersion in the electrolyte. The film so formed, as has been previously explained, is an extremely dense and unhydrated aluminum oxide film.

The temperature of the forming electrolyte should be preferably about 70–90° C., at that portion of the electrolyte where the formation actually takes place. However, as the formation takes place in a limited portion of the electrolyte, temperature control is difficult, unless agitation of the electrolyte takes place. This agitation can be done mechanically, although it occurs naturally, at least to some extent by the heating of the electrolyte which mainly takes place in the region of formation. Such natural agitation which can be promoted by the proper selection of the various factors involved, also takes care of maintaining a uniform constituency of the electrolyte in the region of formation, thus preventing the depletion of its film-forming constituents.

Those portions of the electrode on which the film has been thus formed, because of the blocking action of the film, pass only a small leakage current; thus, notwithstanding that increasing portions of the electrode are immersed in the electrolyte, the current remains concentrated at the unformed entering portions of the electrode. A certain amount of repairing or equalizing formation, as will be later more fully explained, may also take place on the filmed portions of the electrode while advancing in the electrolyte. This equalizing formation, however, does not markedly affect the film formed by the instantaneous forming process.

If desired a resistance of small ohmic value may be inserted in the forming circuit, but for reasons previously stated such a resistance is as a rule unnecessary.

I prefer to make the forming tank sufficiently deep and the electrolyte level therein sufficiently high, to also form a film on the electrode stem, which, whether it is integral with the electrode or forms a separate piece, is usually made of filming metal.

The immersion of the electrode in the electrolyte may take place at a continuous and comparatively slow rate; or it may take place in intermittent small steps, which follow each other in comparatively rapid succession. The actual forming time of the electrodes depends upon various factors, as forming voltage; current capacity of the electric source; cross-sectional surface line of electrode; number of electrodes formed simultaneously; length of electrodes; rate of advance; purity of the aluminum, etc. Aluminum having a purity in excess of 99.6%–99.8% can be formed considerably faster than aluminum of 99.4% to 99.5% purity. The electrode stem, the filming of which needs less care, if desired can be formed at a higher speed than the active portion of the electrode.

For instance, in forming simultaneously a batch of 100 aluminum electrodes of a given type, adapted to be used in 500 volt condensers, and being of 99.8% pure aluminum, the electrodes having a height of 3" and a surface area of 50 square inches (as both sides of the electrode are exposed to the electrolyte, the total exposed surface area is 100 square inches), the formation time is from 5 to 15 minutes, preferably about 10 minutes. The electrodes are gradually immersed in the electrolyte at a constant rate, or as will be explained in connection with Fig. 5, the level of the electrolyte is gradually raised.

An electrode so formed, for instance, the electrode shown in the drawings, or an electrode of any suitable construction, can be assembled into a condenser in known manner. For instance, when used in a wet electrolytic condenser for filter circuits, one or more filmed electrodes form the anode (or anodes), whereas the cathode may be formed by a metallic container of the condenser. The final electrolyte used in the condenser has preferably a smaller pH than has the forming electrolyte, for reasons fully described in U. S. Patent No. 1,916,586 to Preston Robinson and Joseph Collins.

Fig. 3 shows the formation of an endless aluminum foil as being generally used for the electrodes of dry electrolytic condensers. The metal tank 9 contains the film-forming electrolyte 18, through which passes the aluminum foil 15 in the direction of travel indicated by the arrows. At the two ends of the tank the foil 15 is guided by suitable rollers 14–14, which are insulatingly mounted on the tank at 13. The negative side of the electric supply source is connected with the tank 9 by a lead 10, whereas its positive side is connected through lead 11, and suitable contact means, indicated as a contact spring 12, to the aluminum foil 15.

For example, when forming aluminum foil of 99.8% purity, 2 to 4 mil thick and 3" wide, at 500 volt forming voltage, and using a 30 kilowatt generator, a rate of formation of five linear feet per minute can be conveniently obtained.

As the electrode foil immerges into the electrolyte at 17, the film 16 forms almost instantaneously in the manner previously explained. Of the so formed foil, electrodes are cut to their proper length and when used for dry electroyltic condensers, are usually wound into rolls together with interposed spacers, the spacers carrying a viscous electrolyte. Such viscous electrolyte usually comprises an ionogen, for instance a weak acid and/or a salt of a weak acid, and a solvent comprising a polyhydric alcohol, for instance, ethylene glycol or glycerol, and in addition, some water. Suitable electrolytes for such dry condensers are more fully disclosed in my above referred to application Ser. No. 548,270 and in my copending application Ser. No. 716,714, filed March 21, 1934.

In Fig. 4 a somewhat modified arrangement is shown, in which the electrodes to be filmed are fixedly mounted, and the raising of the forming tank effects their gradual immersion in the electrolyte. A plurality of electrodes 27 are shown mounted by means of their stem 26, on a common stationary supporting rack 25. The tank with its electrolyte 21, is movably mounted and can be lowered or raised by means of a lifting arrangement. This arrangement is indicated by a drum 30 actuated by a lever 31, the drum 30 having secured to it one end of each of two ropes 32—32, which pass through pulleys 28 and which have their other ends attached to hooks or eyelets 29, secured to the tank 20. By actuating the lever 31, either manually or automatically, the tank can be gradually raised.

The tank 20 is connected at 22 with the negative pole of the current source, the positive pole of which is connected to the rack 25. If desired a regulating resistance 24 of small ohmic value, can be inserted in the forming circuit to permit the regulation of the current strength in accordance with the type and number of condensers to be formed.

Another arrangement which permits the gradual immersion of the electrodes or electrode foil and which I prefer to use for the formation of batches of individual electrodes, is shown in Fig. 5. The electrodes 27—27 and the tank 39 are and remain in fixed relationship and the electrolyte is gradually admitted to the tank so that its level is raised at an even rate. For this purpose the pipe or hose 40 is provided with an adjustable valve 38. A drain 41 and overflow 42 are also provided on the tank 39. The drainage of the tank takes place while the formed electrodes are removed from the rack and replaced by unformed electrodes, and no loss of time is thus involved. On the other hand, the flow of electrolyte which takes place in this process is highly beneficial and the arrangement permits a very simple gradual immersion of the electrodes.

I can also form individual electrodes by a continuous process, by placing the individual electrodes on a belt conveyor which conveyor passes through the electrolyte, in a manner similar to that shown for an endless electrode foil in Figure 3.

Such an arrangement is shown in Fig. 7 with certain details thereof given in Figs. 8 and 9. An endless belt 52 of conducting material passes over suitable rollers 54—54 above the electrolyte-container 50. The electrodes to be formed are attached to the belt 52 by means of brackets 58, in such a manner that the electrodes are vertically immersed in the electrolyte, while the belt remains outside of the electrolyte. The belt is preferably sufficiently wide to carry a plurality of electrodes side by side, as is shown in Fig. 8.

The forming voltage is applied substantially in the same manner as in the arrangement of Fig. 3.

As stated before, a certain amount of repairing or equalizing formation of the film takes place in the forming electrolyte after its formation in the region of the electrode's entrance into the electrolyte. This equalizing formation is highly beneficial and reduces the time of the aging process, usually performed on the assembled condensers, or may altogether eliminate the necessity of such aging.

As a rule, it is advisable to use for such aging or equalization, a voltage which is slightly in excess of the forming voltage (about 5 to 15 volts higher). In my process I can automatically obtain a slightly higher voltage for the equalizing formation for reasons which I shall explain in connection with the process of Fig. 3.

The voltage between the electrode 15 and the cathode or tank 9 has a fixed value, for instance 500 volts. The resistance of the leads 10 and 11, which are of sufficiently large cross-section, and of the foil 15, is practically negligible. However, the specific resistance of the electrolyte is sufficiently high, that in the path of the heavy current flowing towards the entering edge of the foil, a voltage drop of 5 to 10 volts is created in the electrolyte. Beyond the entrance region of the electrode foil, the current flowing through the electrolyte towards the foil is of a much smaller order of magnitude, i. e., the current density is much lower and the voltage drop in the electrolyte along these paths is more or less negligible. Thus in the example under consideration, the voltage at the film in the entrance region, i. e., the actual forming voltage, may be only about 490 volts, whereas to the already filmed portions of the electrode which pass the electrolyte, approximately the full 500 volts is applied. This excess of voltage above the actual forming voltage of the film effects a highly satisfactory equalizing formation of the already filmed portions of the electrode foil.

Some measurements undertaken when forming 3″ wide aluminum foils at a speed of about 5 linear feet per minute, in an arrangement as shown in Fig. 3, will explain certain relations existing between the film formation and the equalizing formation taking place in this process. The formation was undertaken at a voltage of 500 volts (applied between the tank and electrode) with a total current of 60 amps. passing through the forming circuit.

Under the above conditions it could be ascertained by tests that approximately 55 amperes of the total current passed through the electrode foil at the region of its entrance into the electrolyte, whereas the other 5 amperes passed through the already filmed electrode portion immersed in the electrolyte. This latter portion was about 3 feet long. The entrance region of the electrode would theoretically correspond to the contour line of the electrode and its area would be infinitesimally small. For reasons previously stated (resistances in the circuit, limited capacity of current source, etc.) the entrance region extends at least to a fraction of an inch or even to one to two inches measured from the entrance edge of the electrode, although the exact extent of this region is difficult to determine. A rough indication of the extent of the entrance region, is a glow which takes place at this region. However, even within that portion of the electrode which is thus covered by a glow, the current density considerably drops as measured from the entrance edge of the electrode, the major portion of the current being actually concentrated at this entrance edge.

Even if assuming that the same current density prevails over the whole electrode portion covered by the glow, this current density is of the order of 10 amperes per square inch of exposed area (double surface area) and several hundred times larger than is the current density in the filmed portions of the electrode subjected to equalizing formation. At the entrance edge of the electrode the current density is in all probability of a much higher order of magnitude.

As stated before, the film obtained by my novel forming process is a dense and unhydrated oxide film, whereas the films obtained with prior art processes are less dense and are partly hydrated. The different character of these two types of film appears, for instance, from the voltage-leakage current characteristics of the condensers employing electrodes provided with such films.

In Fig. 6 the abscissae represent the voltages applied to the condensers and the ordinates the leakage currents through same. Curve "a" shows the increase of leakage current with increasing voltages for condensers the electrodes of which are formed according to prior art processes and which have a partly hydrated oxide film, whereas curve "b" applies to condensers the electrodes of which are formed according to my novel process and which have an unhydrated oxide film. From zero up to a voltage "c", the value of which is about three-quarters of that of the forming voltage, the curve "a" follows a line which is intermediate between those determined by Equations 1 and 2, whereas curve "b" follows Equation 1. Above the voltage "c", secondary phenomena interfere, so that the curves somewhat deviate from the values given by these equations. At the forming voltage "d", corresponding to the peak value of the maximum operating voltage, the curves "a" and "b" meet each other and then rise together almost perpendicularly. However, it will be noticed that within the operating range of the condensers, the leakage current of condensers using films made according to my invention is considerably lower than that of the prior art condensers.

My novel film provides for condensers which show greater stability, better shelf life, lower power factor, and lower leakage current, than those having electrodes filmed by prior art processes.

In forming with my invention, electrodes, the successively immersing portions of which have the same contour line or surface areas (as in the case for a smooth foil or for an electrode which is pleated in an axial direction as shown in Fig. 1), the current density at the entrance edge of the electrode remains constant during the formation of the entire electrode.

However, in case of electrodes in which successive immersing portions have unequal surface areas, as is the case, for instance, for cylindrical anodes having corrugations perpendicular to the axis, special arrangements are to be made so as to insure a uniform formation. This consists, for instance, in varying the rate of advance of the electrode for its different portions, i. e., form the small area portions at a greater speed than the large area portions, or by correspondingly decreasing and increasing the current in the forming circuit. The required regulations of speed or current can be automatically coordinated with the advance of the electrode, for any given type of electrode.

While I have described my invention in connection with specific embodiments and in specific applications, I do not wish to be limited thereto, but desire the appended claims to be construed as broadly as permissible in view of the prior art.

What I claim is:

1. In the manufacture of electrolytic condensers, the process which comprises, subjecting an aluminum electrode to film formation in a film-forming electrolyte at an equivalent ion pressure of the order of 100,000,000 pounds per square inch of electrode surface, and forming thereon a high density, unhydrated aluminum oxide film.

2. In the manufacture of wet electrolytic condensers, the process which comprises, gradually immersing an aluminum electrode in a film-forming electrolyte and immediately applying a voltage of the order of several hundred volts between the electrode and the electrolyte, and forming at a high current density a film on successive unfilmed portions of the electrode, substantially at their point of immersion into the electrolyte.

3. In the manufacture of wet electrolytic condensers, the process which comprises the steps, gradually immersing a plurality of filming electrodes in a film-forming electrolyte, immediately applying a voltage of the order of several hundred volts between the electrodes and the electrolyte, and forming at a high current density a film on successive unfilmed portions of the electrodes, substantially at their region of immersion into the electrolyte. and agitating the electrolyte.

4. In the manufacture of electrolytic condensers, the process which comprises, gradually immersing a filming electrode in a film-forming electrolyte, forming at a high current density by the immediate application of a voltage of several hundred volts, a film on successive portions of said electrode substantially at their point of immersion into the electrolyte, and subjecting the so-filmed electrode portions to stabilizing formation as they pass through the electrolyte.

5. In the manufacture of electrolytic condensers, the process which comprises, gradually immersing a filming electrode in a film-forming electrolyte and forming at high current densities and by the immediate application of a voltage of the order of several hundred volts a film on successive portions of said electrode substantially at their point of immersion into the electrolyte, and subjecting the so-filmed electrode portions as they pass through the electrolyte to a stabilizing formation at a slightly higher voltage and at considerably lower current densities.

6. In the manufacture of electrolytic condensers, the process which comprises, moving a tank comprising a film-forming electrolyte towards a stationary filming electrode to gradually immerse said electrode into said electrolyte, and applying the full forming voltage between said electrode and the electrolyte.

7. In the manufacture of electrolytic condensers, the process which comprises, placing into a tank a filming electrode, applying a high forming voltage to said electrode and admitting to the tank at a given rate, a film-forming electrolyte to gradually raise the electrolyte level in the tank and cause the gradual immersion of the film-forming electrode into the electrolyte.

8. In the manufacture of electrolytic condensers, the steps which comprise arranging on a moving endless belt member, individual electrodes of filming metal, passing said member through a filming electrolyte, applying a high forming voltage to successive electrodes as they immerge into the electrolyte, and forming said electrodes substantially in the region of their immersion into the electrolyte.

9. In the process of manufacturing electrolytic condensers having an electrode with consecutive portions of unequal surface areas, the steps which comprise gradually immersing said electrode in a film-forming electrolyte, applying a high voltage between the electrode and the electrolyte, and forming a film on succcessive unfilmed portions of the electrode substantially at their point of immersion into the electrolyte, and varying the rate at which succcessive electrode portions immerse into the electrolyte.

10. In the process of manufacturing electrolytic condensers having an electrode with consecutive portions of unequal surface areas, the steps which comprise gradually immersing said electrode in a film-forming electrolyte, applying a high voltage between the electrode and the electrolyte, and forming a film on consecutive unfilmed portions of the electrode substantially at their point of immersion into the electrolyte, and varying the value of the total forming current for consecutive portions of the electrode.

11. In an electrolytic condenser, a filming electrode having an electrolytically formed dense film consisting of the unhydrated oxide of the said film-forming material.

12. An electrolytic condenser comprising an aluminum electrode, said electrode being provided with a high-density, unhydrated aluminum oxide film.

13. An electrolytic condenser comprising an aluminum electrode, a second electrode and a film-maintaining electrolyte, said anode being provided with a high density unhydrated aluminum oxide film, said condenser having a leakage current which increases with the square of the D. C. voltage applied to the condenser.

PRESTON ROBINSON.